US012157019B2

(12) United States Patent
Muessig

(10) Patent No.: US 12,157,019 B2
(45) **Date of Patent: *Dec. 3, 2024**

(54) SHUTTLE FOR A CLIMBING PROTECTION SYSTEM

(71) Applicant: Honeywell International Inc., Charlotte, NC (US)

(72) Inventor: Frank Muessig, Hof (DE)

(73) Assignee: Honeywell International Inc., Charlotte, NC (US)

( * ) Notice: Subject to any disclaimer, the term of this patent is extended or adjusted under 35 U.S.C. 154(b) by 956 days.

This patent is subject to a terminal disclaimer.

(21) Appl. No.: 17/182,385

(22) Filed: Feb. 23, 2021

(65) Prior Publication Data

US 2021/0178195 A1 Jun. 17, 2021

Related U.S. Application Data

(63) Continuation of application No. 16/086,911, filed as application No. PCT/US2016/023681 on Mar. 23, 2016, now Pat. No. 10,953,247.

(51) Int. Cl.
*A62B 1/14* (2006.01)
*A62B 35/00* (2006.01)
(Continued)

(52) U.S. Cl.
CPC ............ *A62B 1/14* (2013.01); *A62B 35/0081* (2013.01); *A62B 35/04* (2013.01); *A63B 29/02* (2013.01)

(58) Field of Classification Search
CPC ........ A62B 1/14; A62B 35/0081; A63B 29/02
See application file for complete search history.

(56) References Cited

U.S. PATENT DOCUMENTS

| | | | |
|---|---|---|---|
| 3,876,036 | A | 4/1975 | Sweet |
| 5,083,350 | A | 1/1992 | Sandreid |

(Continued)

FOREIGN PATENT DOCUMENTS

| | | | |
|---|---|---|---|
| AU | 2008300650 | B9 | 6/2013 |
| CA | 2088180 | C | 9/1995 |

(Continued)

OTHER PUBLICATIONS

U.S. Appl. No. 16/086,911, filed Sep. 20, 2018, U.S. Pat. No. 10,953,247, Patented.

(Continued)

*Primary Examiner* — Colleen M Chavchavadze
(74) *Attorney, Agent, or Firm* — Alston & Bird LLP

(57) ABSTRACT

A shuttle (20) for a climbing protection system (10) is provided and includes a clamping member (26) mounted on a frame (22) for movement between a an opening position, a free position wherein the shuttle (20) can move freely along an elongate support member (12), and a clamping position wherein the clamping member (26) resists movement of the shuttle (20) relative to the elongate support member (12), and an anti-inversion member (30) mounted on the frame (22) for movement between a first closed position blocking insertion of the elongate support member (12) and an open position where the anti-inversion member (30) does not block insertion of the elongate support member (12). The anti-inversion member movable from the open position to the closed position when the shuttle (20) is moved from a desired orientation to a non-desired orientation relative to gravity with the clamping member (26) in the opening position and wherein the clamping member (26) and the anti-inversion member (30) are engaged to maintain the clamping member (26) in the opening position when the shuttle (20) is in the non-desired orientation.

15 Claims, 5 Drawing Sheets

(51) Int. Cl.
*A62B 35/04* (2006.01)
*A63B 29/02* (2006.01)

(56) References Cited

U.S. PATENT DOCUMENTS

| | | | | | |
|---|---|---|---|---|---|
| 5,265,696 | A * | 11/1993 | Casebolt | A62B 1/14 182/8 |
| 5,855,251 | A | 1/1999 | Deuer | |
| 7,080,716 | B2 | 7/2006 | Cherpitel | |
| 8,225,905 | B2 | 7/2012 | Delaittre et al. | |
| 8,281,895 | B2 | 10/2012 | Gassner | |
| 9,132,297 | B2 | 9/2015 | Casebolt et al. | |
| 9,168,402 | B2 | 10/2015 | Casebolt et al. | |
| 9,289,634 | B2 | 3/2016 | Chabod et al. | |
| 9,750,959 | B2 | 9/2017 | Sepe | |
| 2007/0119653 | A1 | 5/2007 | Brown et al. | |
| 2011/0186388 | A1* | 8/2011 | Sudale | A62B 1/14 188/65.2 |
| 2015/0114752 | A1* | 4/2015 | Bornack | A62B 1/14 182/5 |
| 2016/0130875 | A1* | 5/2016 | Hwang | A62B 1/14 182/5 |

FOREIGN PATENT DOCUMENTS

| | | | |
|---|---|---|---|
| CA | 2147233 | A1 | 10/1995 |
| CN | 2801205 | Y | 8/2006 |
| CN | 102142782 | A | 8/2011 |
| DE | 102012207223 | B3 | 9/2013 |
| WO | 2008/046446 | A1 | 4/2008 |
| WO | 2016/093850 | A1 | 6/2016 |
| WO | 2017/030558 | A1 | 2/2017 |

OTHER PUBLICATIONS

161/162 Communication for corresponding European Application No. 16716098.5 dated Jan. 4, 2019, 3 pages.

Communication about intention to grant a European patent Mailed on Mar. 31, 2020 for EP Application No. 16716098.5, 5 pages.

Decision to grant a European patent Mailed on Aug. 13, 2020 for EP Application No. 16716098.5, 2 pages.

Examiner Interview Summary Record (PTOL-413) Mailed on Nov. 25, 2020 for U.S. Appl. No. 16/086,911.

First Office for Chinese Patent Application No. 201680084887.4 dated Apr. 15, 2020, 12 pages.

Intention to Grant for European Application No. 16716098.5, dated Mar. 31, 2020, 28 pages.

International Search Report and Written Opinion for corresponding International Application No. PCT/US2016/023681, 8 pages.

Non-Final Rejection Mailed on Jun. 22, 2020 for U.S. Appl. No. 16/086,911.

Notice of Allowance and Fees Due (PTOL-85) Mailed on Nov. 25, 2020 for U.S. Appl. No. 16/086,911.

* cited by examiner

SHUTTLE FOR A CLIMBING PROTECTION SYSTEM

PRIORITY CLAIM

This application is a continuation application of and claiming the benefit of priority to U.S. application Ser. No. 16/086,911 entitled "Shuttle For A Climbing Protection System" filed on Sep. 20, 2018, which is the U.S. National Stage application of PCT/US16/23681 entitled "Shuttle For A Climbing Protection System" filed on Mar. 23, 2016, the entirety of which are each incorporated by reference herein.

FIELD

The present disclosure relates to rope grabs, fall arrestors or shuttles for a climbing protection system for preventing a user of a ladder, a platform or the like from falling. Such shuttles are guided along an elongate support member, typically a cable, and grip the cable if a user falls. These shuttles have a guiding mechanism for the cable and often have a rotatably mounted clamping lever which has a cam at a first end facing the cable and an anchor/connecting point at a second end protruding from the casing of the shuttle.

BACKGROUND

Climbing protection systems usually consist of an elongate member, for example a wire cable, and a following fall arrester guided on the cable, which is hereafter called a rope grab or shuttle. The cable can be fastened to a structure or the like by means of cable and attachments, a cable tensioner and fastening devices. A user of the climbing protection system is connected by means of a full body harness to the shuttle which follows the user. The full body harness is usually connected to a clamping lever of the shuttle which, if a user falls, ensures that the shuttle grips the cable of the climbing protection system, in order to thus prevent the free fall of the user.

A shuttle of the type described above is generally known, to which it is also possible to fasten a carabineer which connects a user's full body harness to the shuttle. In order to attach the shuttle to, or separate it from, the cable, a closing lever is released and a clamping lever, to which the carabineer is fastened, is swiveled upwards to open a gap that allows the cable to be inserted into or removed from the shuttle. If the user falls, a clamping jaw of the clamping lever is pressed against the cable. Furthermore, when the shuttle is used, the clamping jaw closes the gap along the guiding mechanism of the shuttle to help prevent the cable from disengaging from the shuttle.

One example of such a shuttle was offered for sale under the product name S. K. C. by Antec, 35-37 rue de la Bidauderie, BP334, 18103 Vierzon, France. A carabineer, which connects a user's full body harness to the shuttle, is fastened in an eye at one end of a clamping lever. The clamping lever is rotatably mounted in the shuttle and is swiveled in the event of a fall by the pull exerted on it by the full body harness, with the result that the cam of the clamping lever presses against the cable guided in the guiding mechanism of the shuttle and the shuttle grips the cable. Furthermore, when the shuttle is used, the clamping lever closes a gap along the guiding mechanism, which must be opened to attach the shuttle to the cable. In addition, when the shuttle is used, the gap is closed by a plastic lever which has to be folded back first before the shuttle can be removed from the cable. In order to prevent inadvertent release of the shuttle from the cable, the carabineer must be separated from the shuttle, as otherwise the clamping lever cannot be swiveled far enough to free the gap.

A problem with shuttles for a climbing protection system of the types described above is that they are not always suitable for use in a climbing protection system having a cable that is secured to a structure or the like by intermediate supports or bracket, as the shuttle cannot be moved over such intermediate supports. The shuttle must be passed manually over such intermediate supports.

US 2007/0119653 A1 describes a climbing protection system consisting of a cable tensioned by several intermediate supports and a fall arrest device/shuttle that can be moved along the cable. The fall arrest device has a U-shaped member, which encloses the cable of the climbing protection device, and a holder cam, which is rotatably mounted. In the event of a fall, the cable is clamped between the holder cam and the U-shaped member, with the result that the fall arrest device is locked in place on the cable. The fall arrest device can be removed from or attached to the cable at any time. For this purpose two mechanisms which are independent of each other must be actuated. The two mechanisms are arranged so that they cannot be actuated with one hand.

AU 2008/300650 B2 shows another example of a climbing protection device similar to the above-described devices, but having a locking or blocking plate that is spring biased to a position that reduces a gap through which the cable can be inserted and/or removed into engagement with the shuttle, and provides a user actuated button that releases this plate so that a user can move the plate to a position that opens the gap, thereby allowing a cable to be removed from engagement with the shuttle or inserted into engagement with the shuttle.

International Appln. No. PCT/US14169906 discloses another example of a shuttle wherein a blocking plate is actuated between closed and open positions by a clamping lever as the clamping lever moves from a free position to an opening position, with a locking lever being provided to prevent movement of the clamping lever to the opening position. The blocking plate prevents removal of an elongate support member, such as a cable, from the shuttle when the blocking plate is in the closed position.

While each of the above-described devices are suitable for their intended purpose, there is always room for improvement. For example, there is a continuing desire to further simplify such shuttles with respect to assembly and parts. As another example, there is a continuing desire to simplify the operation of such shuttles. By way of further example, there is a desire to prevent such shuttles from being loaded onto an elongate support member in an inverted fashion by an unobservant or untrained user.

SUMMARY

In accordance with one feature of this disclosure, a shuttle for a climbing protection system is provided wherein the shuttle can be connected to a user and is guided along a cable, rope, or other elongate support member as the user climbs and that grips the elongate support member in response to the user falling. The shuttle includes a frame, a guide structure on the frame configured to receive an elongate support member and to guide the shuttle along the elongate support member as a user attached to the shuttle climbs. A clamping member is mounted on the frame for movement between a free position wherein the shuttle can move freely along the elongate support member received in the guide structure and a clamping position wherein the clamping member engages against the elongate support member in the guide structure to resist movement of the shuttle relative to the elongate support member, the clamping member configured to move from the free position to the clamping position in response to a downward movement by the user attached to the shuttle. An anti-inversion member is mounted on the frame for movement between a first closed position wherein the anti-inversion member blocks the elongate support member from being received into the guide structure with the shuttle in an non-desired orientation relative to gravity, and an open position wherein the anti-inversion member does not block the elongate support member from being received in the guide structure. The clamping member is movable to an opening position from the free position. The clamping member in the opening position engages the anti-inversion member to maintain the anti-inversion member in the open position with the shuttle in a desired orientation relative to gravity. The anti-inversion member is configured to move from the open position to the first closed position under the force of gravity in response to the shuttle being moved to the non-desired orientation relative to gravity after the clamping member has been moved to the opening position with the shuttle in the desired orientation relative to gravity.

As one feature, the anti-inversion member is mounted on the frame to pivot between the closed and open positions of the anti-inversion member.

In one feature, the anti-inversion member is mounted to move between the open position and a second closed position wherein the anti-inversion member blocks the elongate support member from being removed from the guide structure with the shuttle in the desired orientation relative to gravity.

According to one feature, the clamping member includes a surface that engages a surface on the anti-inversion member to move the anti-inversion member between the second closed position and open position as the clamping member moves between the free and opening positions.

As one feature, the anti-inversion member is configured to move from the open position to the second closed position by the force of gravity.

In one feature, the clamping member and the anti-inversion member engage each other to maintain the clamping member in the opening position.

As one feature, the clamping member and the anti-inversion member include interlocking features that engage each other to maintain the anti-inversion member in the first closed position and the clamping member in the opening position with the shuttle in the non-desired orientation relative to gravity. In a further feature, the interlocking features include a finger formed on one of the clamping member and the anti-inversion member and a finger receiving notch formed on the other of the clamping member and the anti-inversion member.

As one feature, a blocking member is mounted on the frame for movement between a closed position blocking removal of the elongate support member from the guide structure and an open position where the blocking member does not block removal of the elongate support member from the guide structure.

In one feature, the blocking member includes a wheel configured to engage against the elongate support member in the guide structure with the blocking member in the closed position and a carrier mounting the wheel for rotation, the carrier being pivot mounted to the frame.

According to one feature, the clamping member in the free position blocks removal of the elongate support member from the guide structure, the clamping member in the opening position does not block removal of the elongate support member, and the clamping member operably engages the blocking member to move the blocking member from the closed position to the open position as the clamping member is moved from the free position to the opening position.

As one feature, the clamping member includes a connection feature configured to receive a connector for attaching a user to the shuttle, and a clamping surface that engages the elongate support member received in the guide structure with the clamping member in the clamping position. The connection feature is spaced from the clamping surface.

According to one feature, the clamping member is pivot mounted to the frame at a location between the connection feature and the clamping surface.

In one feature, the frame includes two plate members located on opposite sides of the locking, clamping and blocking members. In a further feature, one of the two plate members is a single piece that defines the guide structure.

It should be understood that the shuttle disclosed herein can include any combination of the above features.

Other features and advantages will become apparent from a review of the entire specification, including the appended claims and drawings. In this regard, it should be understood that a shuttle according to this disclosure may include any of the above-described features, including any combination of the above-described features.

DETAILED DESCRIPTION

Figure 1:
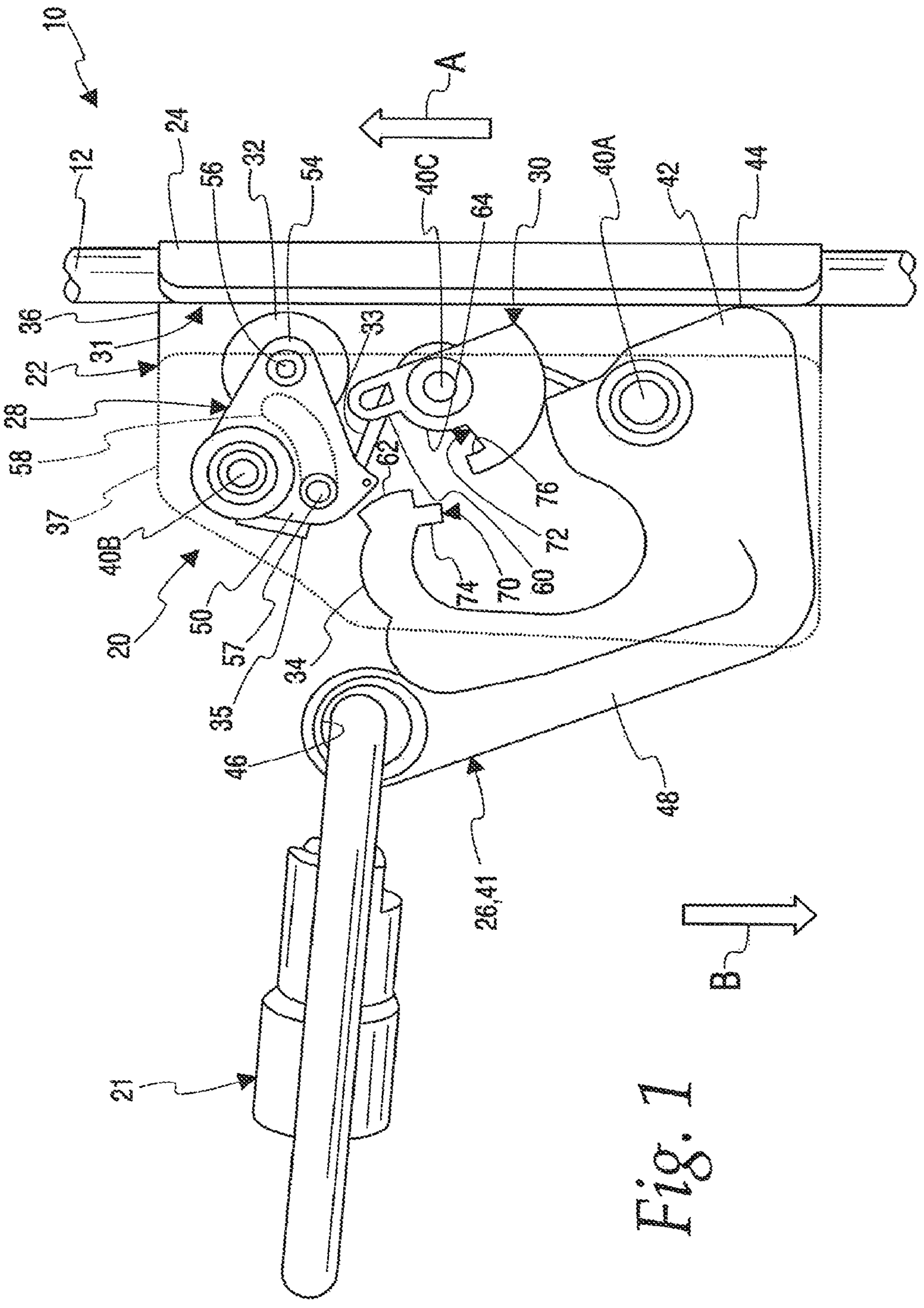
FIG. 1 is a side elevation view of a fall protection system including a shuttle according to this disclosure, with a clamping member/lever of the shuttle shown in a "free" position wherein the shuttle can be moved along an elongate support member, with a frame component shown in phantom for purposes of illustration.

With reference to FIG. 1, a fall protection system 10 is shown and includes an elongate support member 12 in the form of a wire cable 12 being anchored to a support structure, such as a wall or structural beam (not shown), by a support bracket (not shown), and a rope grab or shuttle 20 that can be connected to a user so as to protect the user in the event of a fall. The shuttle 20 can be connected to a user by any suitable connector, such as for example a carabineer 21, and is guided along the cable 12 as the user connected to the shuttle 20 climbs in the upward direction, such as indicated by the arrow "A" in FIG. 1, which is generally opposite the direction of the force of gravity in the environment in which the fall protection system 10 is being employed. It should be appreciated that there are many forms of elongate members 12 and support brackets that are known in the art and are suitable within the scope of this disclosure for use with a shuttle 20 according to this disclosure. Accordingly, the details of the elongate member 12 and the support bracket are not critical to an understanding of the shuttle 20 as disclosed herein and will not be described in further detail.

As best seen in FIGS. 1-5, the shuttle 20 includes a frame, shown generally at 22, a guide structure 24 on the frame, a clamping member 26 mounted on the frame 22, a blocking member 28 mounted on the frame 22, and an anti-inversion member 30 mounted on the frame 22. The guide structure 24 is configured to receive the elongate support member 12 and to guide the shuttle 20 along the elongate support member 12 as a user attached to the shuttle 20 climbs. In this regard, in the illustrated embodiment, the guide structure 24 has an elongate, semi-cylindrical channel 31 that conforms to the outer surface shape of the elongate member 12, which is cylindrical for the illustrated cable 12.

Figure 2:
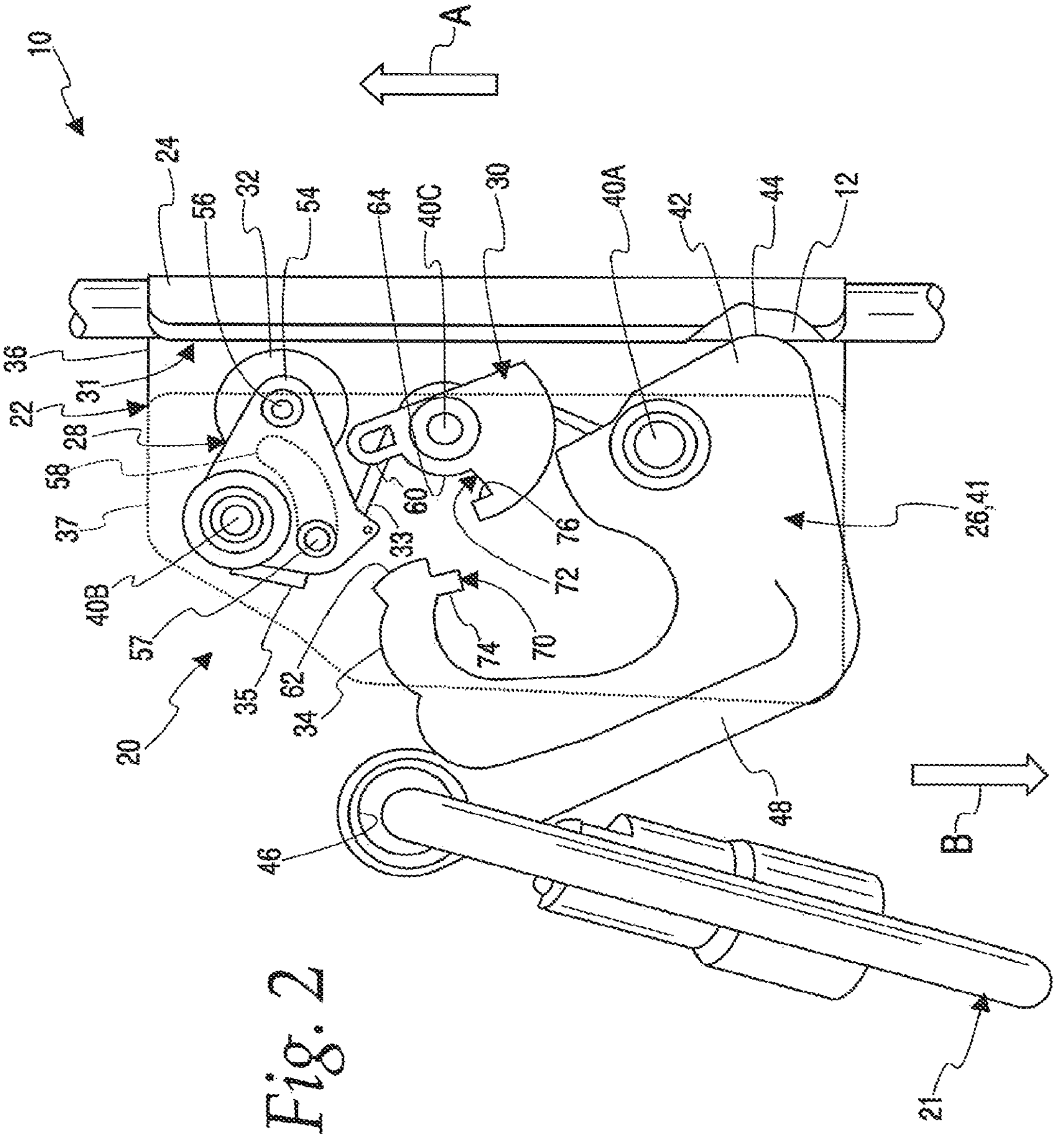
FIG. 2 is a view similar to FIG. 1, but showing the clamping member in a clamping or gripping position wherein the elongate member is gripped by the clamping member to prevent downward movement of the shuttle along the elongate support member.

The clamping member 26 is mounted to the frame 22 for movement between a free position shown in FIG. 1 wherein the shuttle 20 can move freely along the length of the elongate support member 12 and a clamping position shown in FIG. 2 wherein the clamping member 26 engages against the elongate support member 12 in the guide structure 24 to resist or prevent movement of the shuttle 20 relative to the elongate support member 12, thereby arresting the fall of a user. In this regard, the clamping member 26 is configured to move from the free position shown in FIG. 1 to the clamping position shown in FIG. 2 in response to a downward fall (as indicated by arrow "B" in FIG. 2) by a user attached to the shuttle 20.

Figure 3:
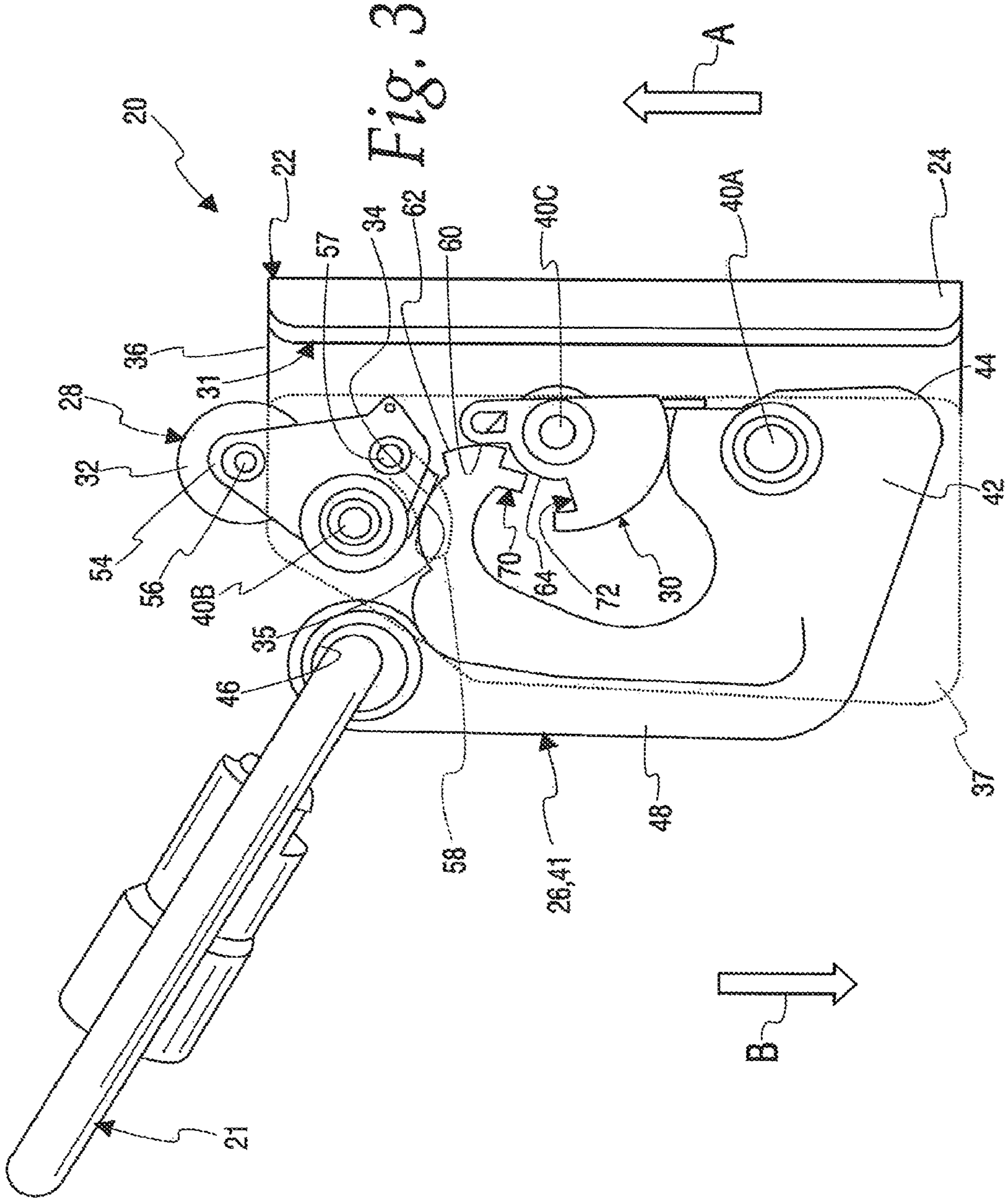
FIG. 3 is a view similar to FIG. 2, but showing the clamping member in an opening position.
Figure 4:
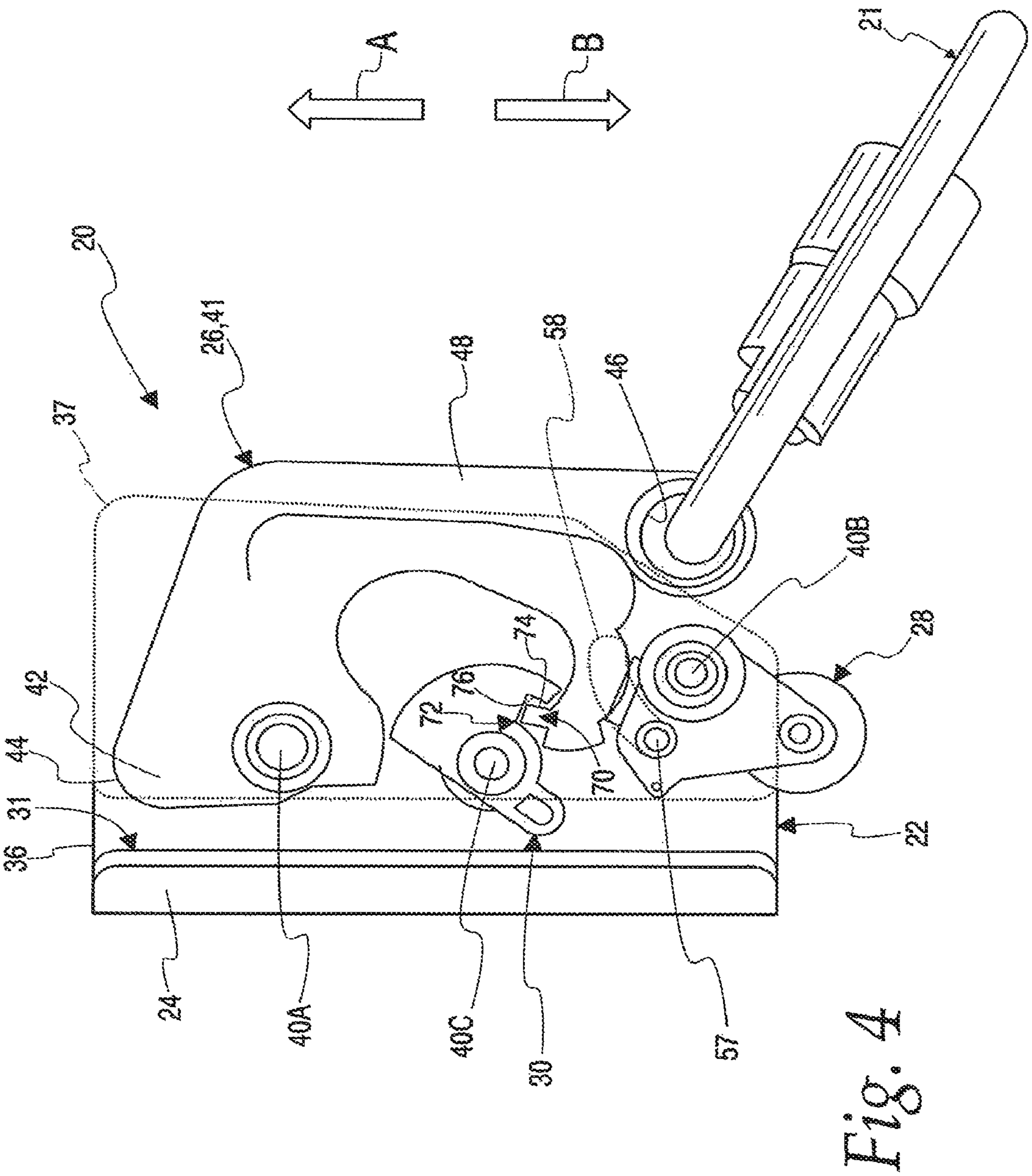
FIG. 4 is a view similar to FIG. 3, but showing the shuttle in an inverted condition wherein the shuttle is inverted relative to gravity in comparison to its desired orientation shown in FIGS. 1-3.
Figure 5:
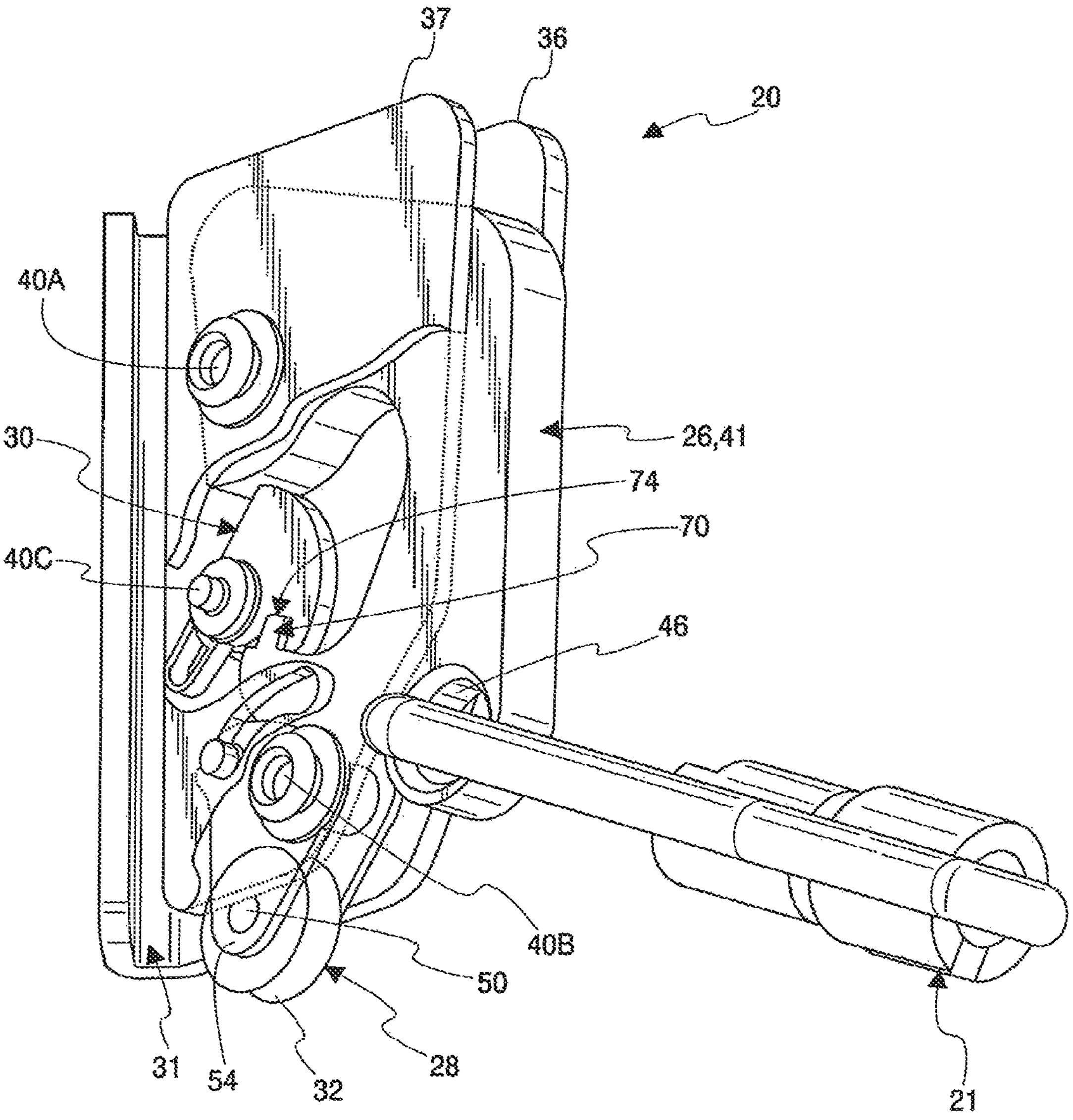
FIG. 5 is a perspective view of the shuttle in the inverted condition of FIG. 4.

The blocking member 28 is mounted on the frame 22 for movement between a closed position shown in FIGS. 1 and 2 blocking removal of the elongate support member 12 from the guide structure 24 and an open position shown in FIGS. 3, 4, and 5 where the blocking member 28 does not block removal of the elongate member 12 from the guide structure 22. In this regard, with reference to FIGS. 1 and 2, in the illustrated embodiment, the blocking member 28 includes a grooved wheel 32 that can engage against the elongate support member 12 for rolling contact therewith with the blocking member 28 in the closed position. In this regard, it may be desirable for the groove of the wheel 32 to have a shape that conforms to the outer surface shape of the elongate member 12, which is cylindrical for the illustrated cable 12. In the illustrated embodiment, the blocking member 28 is biased toward the closed position by a spring 33. In the open position shown in FIGS. 3, 4, and 5, the wheel 32 is disengaged from the elongate support member 12 and spaced therefrom by a sufficient distance to allow the removal of the elongate member 12 from the guide structure 24.

The anti-inversion member 30 is mounted on the frame 22 for movement between a first closed position shown in FIGS. 4 and 5 wherein the anti-inversion member 30 prevents the elongate support member 12 from being loaded into the guide structure 24 and the shuttle 20, and an open position shown in FIG. 3 wherein the anti-inversion member 30 does not block the elongate support member 12 from being received in the guide structure 24 and the shuttle 20.

The clamping member 26 is mounted so that it is also movable to an opening position shown in FIG. 3 from the free position shown in FIG. 1. As the clamping member 26 moves from the free position shown in FIG. 1 to the opening position shown in FIG. 3, the clamping member 26 is operably engaged with the blocking member 28 to move the blocking member 28 from the closed position shown in FIGS. 1 and 2 to the open position shown in FIG. 3. In this regard, a surface 34 of the clamping member 26 engages a surface 35 of the blocking member 28, as shown in FIG. 3, to move the blocking member 28 to the open position shown in FIG. 3.

Having broadly described the structure and operational features of the shuttle 20, each of the specific components 22, 24, 26, 28 and 30 of the illustrated embodiment will be described in more detail below. However, it should be understood that the illustrated embodiment and associated details describe only one of many contemplated configurations capable of meeting the structural and operational features described above.

In the illustrated embodiment, the frame 24 is composed of two plate structures 36 and 37 that are joined together with suitable fasteners 38 that pass through corresponding cylindrical posts or spacers 40 of the frame 24. The plate structure 36 is a one-piece structure and defines the guide structure 24 and its channel 31. Such frames are known and are shown, for example, in International Appln. No. PCT/US14/69906, filed Dec. 12, 2014. It should be appreciated that the frame plates 36 and 37 can be formed using any suitable means and material, such as being formed metal plate or a suitable molded structural material. It should be further appreciated that there are many possible alternate constructions for the frame 24 that are contemplated within the scope of this disclosure and may be desirable depending on the particular environment for the fall protection system 10.

As best seen in FIGS. 2 and 3, the clamping member 26 of the illustrated embodiment is a clamping lever 41 and includes a cam end 42 having a clamping surface 44 that engages the elongate support member 12 and an anchor or connection feature in the form of a circular eye 46 that is spaced from the clamping surface 44 and configured for connection to a user using any suitable means, such as for example, the carabineer 21 that is inserted through an opening 47 of the connection feature 46. In the illustrated embodiment, the clamping member 26 includes an optional damping feature, shown generally at 48, which allows the connection feature 46 to move relative to the remainder of the clamping member 26 and the shuttle 20 via permanent deformation of the damping feature 48. Such damping features are known and are described in more detail in WO 2008/046446 A1. Intermediate the clamping surface 44 and the connection feature 46, the clamping member 26 is pivot mounted to the frame 22 using any suitable means, such as a cylindrical journal feature on the post 40A that passes through a bearing bore formed in the clamping member 26. This allows the clamping member 26 to pivot relative to the frame 22 between the clamping position, the free position, and the opening position.

The blocking member 28 includes a carrier 50 that mounts the wheel 32 for rotation and defines the surface 35. The carrier 50 is mounted on the frame 22 to pivot between the closed and open positions. In this regard in the illustrated embodiment, a cylindrical journal feature on the post 40B extends through a bore formed in the carrier 50. The carrier includes a grooved portion 54 that extends on both sides of the wheel 32, with an axle 56 extending through the wheel 32 to mount the wheel 32 for rotation. Optionally, a cross pin 57 can be fixed in the carrier 50 and received in an arcuate groove 58 provided in one or both of the plate structures 36 and 37, with the pin 57 extending outward from the groove 58 to allow manual manipulation of the blocking member 28.

The anti-inversion member 30 is mounted to pivot between the first closed position and open position using any suitable pivot mount, such as a cylindrical journal feature on the post 40C of the frame 22 received within a bearing bore formed in the anti-inversion member 30. As best seen in FIG. 3, the anti-inversion member 30 includes a surface 60 that engages with the surface 62 of the clamping member 26 to move the anti-inversion member 30 from a second closed position shown in FIGS. 1 and 2 to the open position shown in FIG. 3 wherein it will not block removal of the elongate member 12 from the guide structure 24. As best seen in FIGS. 4 and 5, the anti-inversion member 30 is configured to pivot from the open position to the first closed position under the force of gravity whenever the shuttle 20 is inverted so it is in a non-desired orientation relative to gravity, including after the clamping member 26 has been moved to the opening position shown in FIG. 3 with the shuttle 20 in the desired orientation relative to gravity. In this regard, the surfaces 60, 62, and 64 are shaped to allow the anti-inversion member 30 to pivot from the open position to the first closed position in response to the shuttle being inverted with the clamping member 26 in the opening position, with the surface 60 being pivoted away from contact with the surface 62 of the clamping member 26 when the shuttle 20 is inverted relative to gravity (i.e., positioned upside-down in a non-desired orientation relative to gravity). The anti-inversion member 30 in the first closed position blocks the insertion of the elongate member 12 into the shuttle 20 and the guide structure 24. In this regard, it should be understood that the center of mass of the anti-inversion member 30 is located relative to the pivot mount location of the post 40C so that the force of gravity causes the anti-inversion member 30 to assume the orientations shown in FIGS. 1 and 2 when the shuttle 20 is in its desired position relative to gravity, and then to assume the opposite orientation when the shuttle 20 is positioned upside-down (inverted) as shown in FIGS. 4 and 5 in a non-desired orientation relative to gravity. The same is true for the clamping member 26, which has its center of mass positioned relative to the pivot mount location of the post 40A so that gravity forces the clamping member 26 to the position shown in FIGS. 4 and 5. As seen in FIGS. 4 and 5, the clamping member 26 and the anti-inversion member 30 engage each other to maintain the clamping member 26 in the opening position with the shuttle in the inverted condition (non-desired orientation relative to gravity). In this regard, in the illustrated embodiment, the clamping member 26 and the anti-version member 30 include interlocking features 70 and 72 that engage each other to maintain the clamping member 26 in the opening position with the shuttle 20 in the inverted orientation. In the illustrated embodiment, the interlocking feature 70 is provided in the form of a finger 70 formed on the clamping member 26, and the interlocking feature 72 is provided in the form of a finger receiving notch 72 formed in the anti-inversion member 30. The finger 70 has a surface 74 that engages a surface 76 of the notch 72 to retain the clamping member 26 in the opening position with the shuttle 20 in the inverted orientation. It should be appreciated that while an advantageous form of the interlocking features 70, 72 has been shown in the illustrated embodiment, this disclosure contemplates that other interlocking features may be utilized and may be desirable depending upon the particulars of each application.

It should further be appreciated that cooperation of the anti-inversion member 30 with the clamping member 26 again provides a simplified user experience by placing the shuttle 20 in a condition wherein the shuttle 20 cannot be loaded onto the elongate support member 12 when the shuttle 20 is in the inverted (upside-down) orientation. It should further be appreciated in this regard that the geometry of the anti-inversion member 30 and the clamping member 26 allows the anti-inversion member 30 to rotate from the open position shown in FIG. 3 to the first closed position shown in FIGS. 4 and 5 under the force of gravity if the shuttle 20 is inverted after first being placed in the configuration shown in FIG. 3 while in the desired orientation. Further, it should be appreciated that the interlocking features 70 and 72 prevent the clamping member 26 from moving to its free and clamping positions while the shuttle 20 remains inverted. It should also be appreciated that by providing the shuttle 20 with a clamping member 26 and a blocking member 28 at opposite ends of the guide structure 24 to prevent removal of the elongate support member 12 from the guide structure 24, the connection of the shuttle 20 to the elongate support structure 12 is very secure, especially since both entries of the elongate support member 12 into the shuttle 20 are secured. It should further be appreciated that the operation of the shuttle 20 is simplified by allowing simple removal of the shuttle 20 from the elongate support member 12 with a simple pivot motion of the clamping member 26 to the opening position, thereby locating the clamping member 26, the blocking member 28 and the anti-inversion member 30 so that they allow removal of the elongate support member 12 from the shuttle 20 and the support structure 24. Last, it should be appreciated that the disclosed shuttle 20 provides a simplified assembly with a minimum of moving parts and components.

It should be understood that any embodiments described herein are illustrative of the structure and operational features of the shuttle 20 and this disclosure contemplates that the shuttle 20 can be provided in other forms and configurations. By way of example, while the clamping, blocking and anti-inversion members 26, 28 and 30 have been shown as being mounted for pivoting movement between their operating positions, other mountings and movements are possible. By way of further example, while the illustrated embodiment shows a particular configuration for the pivot mounting of each of the clamping, blocking and anti-inversion members 26, 28 and 30, any suitable pivot mounting can be utilized. As yet a further example, while the frame 22 has been shown as being constructed from two plate structures 36 and 37, it is possible for the frame to be composed of something other than plate structures, or more than or fewer than the illustrated plate structures. As yet a further example, while the illustrated embodiment shows certain specific shapes for each of the components 22, 24, 26, 28 and 30, it should be understood that other shapes are possible and can provide the above-described features for the shuttle 20. Accordingly, it should be understood that no limitations are intended unless they are expressly recited in one of the appended claims.

The invention claimed is:

1. A climbing protection system comprising:

a frame;

a guide structure on the frame and configured to receive a support member and to guide the climbing protection system along the support member in response to a user, attached to the climbing protection system, climbs a ladder or a platform;

a clamping member mounted on the frame configured to move between a free position and a clamping position, wherein the climbing protection system can move freely along the support member in the free position and wherein the clamping member engages the support member in the guide structure to resist movement of the climbing protection system relative to the support member in the clamping position;

an anti-inversion member mounted on the frame configured to move between a first closed position wherein the anti-inversion member blocks the support member from being received into the guide structure with the climbing protection system in an inverted position relative to gravity, and an open position wherein the anti-inversion member does not block the support member from being received in the guide structure; and wherein:

the clamping member comprises a surface that engages a surface on the anti-inversion member to move the anti-inversion member between a second closed position wherein the anti-inversion member blocks the support member from being removed from the guide structure with the climbing protection system in a non-inverted position relative to gravity, and the open position as the clamping member moves between the free position and an opening position, wherein the clamping member in the opening position engages the anti-inversion member to maintain the anti-inversion member in the open position with the climbing protection system in the non-inverted position relative to gravity.

2. The climbing protection system of claim 1 wherein the anti-inversion member is mounted on the frame configured to pivot between the first closed position, the second closed position and the open position of the anti-inversion member.

3. The climbing protection system of claim 1, wherein the anti-inversion member is configured to move between the open position and the second closed position.

4. The climbing protection system of claim 1, wherein the anti-inversion member is configured to move to the first closed position under a force of gravity in response to the climbing protection system being placed in the inverted position relative to gravity after the clamping member has been moved to the opening position with the climbing protection system in the non-inverted position relative to gravity.

5. The climbing protection system of claim 1 wherein the anti-inversion member is configured to move from the open position to the second closed position by a force of gravity.

6. The climbing protection system of claim 1 wherein the clamping member and the anti-inversion member are configured to engage each other to maintain the clamping member in the opening position with the climbing protection system in the inverted position relative to gravity.

7. The climbing protection system of claim 1 wherein the clamping member and the anti-inversion member comprise interlocking features that are configured to engage each other to maintain the clamping member in the opening position with the climbing protection system in the inverted position relative to gravity.

8. The climbing protection system of claim 7 wherein the interlocking features comprise a finger formed on one of the clamping member and the anti-inversion member and a finger receiving notch formed on the other of the clamping member and the anti-inversion member.

9. The climbing protection system of claim 1 further comprising a blocking member mounted on the frame configured to move between a closed position blocking removal of the support member from the guide structure and an open position where the blocking member does not block removal of the support member from the guide structure.

10. The climbing protection system of claim 9 wherein the blocking member comprises:

a wheel configured to engage against the support member in the guide structure with the blocking member in the closed position; and a carrier mounting the wheel for rotation, the carrier being pivot mounted to the frame.

11. The climbing protection system of claim 9 wherein the clamping member in the free position is configured to block removal of the support member from the guide structure, the clamping member in the opening position does not block removal of the support member, and the clamping member operably engages the blocking member to move the blocking member from the closed position to the open position as the clamping member is moved from the free position to the opening position.

12. The climbing protection system of claim 1 wherein the clamping member comprises:

a connection feature configured to receive a connector for attaching a user to the climbing protection system; and a clamping surface that is configured to engage the support member received in the guide structure with the clamping member in the clamping position, the connection feature being spaced from the clamping surface.

13. The climbing protection system of claim 12 wherein the clamping member is pivot mounted to the frame at a location between the connection feature and the clamping surface.

14. A climbing protection system, comprising:

a frame;

a guide structure on the frame and configured to receive a support member and to guide the climbing protection system along the support member in response to a user, attached to the climbing protection system, climbs a ladder or a platform;

a clamping member mounted on the frame configured to move between a free position wherein the climbing protection system can move freely along the support member received in the guide structure and a clamping position wherein the clamping member engages the support member in the guide structure to resist movement of the climbing protection system relative to the support member, the clamping member configured to move from the free position to the clamping position in response to a downward movement by the user attached to the climbing protection system;

an anti-inversion member mounted on the frame configured to move between a first closed position wherein the anti-inversion member blocks the support member from being received into the guide structure with the climbing protection system in an inverted position relative to gravity, and an open position wherein the anti-inversion member does not block the support member from being received in the guide structure; and wherein:

the clamping member and the anti-inversion member comprise interlocking features that engage each other to maintain the clamping member in an opening position with the climbing protection system in the inverted position relative to gravity, wherein the clamping member in the opening position engages the anti-inversion member to maintain the anti-inversion member in the open position with the climbing protection system in a non-inverted position relative to gravity.

15. A climbing protection comprising:

a frame;

a guide structure on the frame and configured to receive a support member and to guide the climbing protection system along the support member in response to a user, attached to the climbing protection system, climbs a ladder or a platform;

a clamping member mounted on the frame configured to move between a free position wherein the climbing protection system can move freely along the support member received in the guide structure and a clamping position wherein the clamping member engages the support member in the guide structure to resist movement of the climbing protection system relative to the support member, the clamping member configured to move from the free position to the clamping position in response to a downward movement by the user attached to the climbing protection system;

an anti-inversion member mounted on the frame configured to move between a first closed position wherein the anti-inversion member blocks the support member from being received into the guide structure with the climbing protection system in an inverted position relative to gravity, and an open position wherein the anti-inversion member does not block the support member from being received in the guide structure; and a blocking member mounted on the frame configured to move between a closed position blocking removal of the support member from the guide structure and an open position where the blocking member does not block removal of the support member from the guide structure, wherein the anti-inversion member is configured to move to the first closed position under the force of gravity in response to the climbing protection system being placed in the inverted position relative to gravity after the clamping member has been moved to an opening position with the climbing protection system in a non-inverted position relative to gravity, wherein the clamping member in the opening position engages the anti-inversion member to maintain the anti-inversion member in the open position with the climbing protection system in a non-inverted position relative to gravity.

* * * * *